United States Patent [19]
Silverman

[11] 3,956,649
[45] May 11, 1976

[54] BRUSHLESS ROTARY SIGNAL TRANSDUCER

[75] Inventor: Alvin J. Silverman, Massapequa, N.Y.

[73] Assignee: Aeroflex Laboratories, Inc., Plainview, N.Y.

[22] Filed: June 20, 1974

[21] Appl. No.: 481,431

[52] U.S. Cl. .............................. 310/111; 322/31; 322/100
[51] Int. Cl.² ........................................ H02K 39/00
[58] Field of Search ............ 322/31, 100; 310/111; 318/314, 318, 326–328

[56] References Cited
UNITED STATES PATENTS

| | | | |
|---|---|---|---|
| 1,181,996 | 5/1916 | Cunningham | 310/111 X |
| 1,250,752 | 12/1917 | Alexanderson | 310/111 |
| 2,667,615 | 1/1954 | Brown | 310/111 |
| 3,132,269 | 5/1964 | Craske | 310/111 |

FOREIGN PATENTS OR APPLICATIONS

| | | | |
|---|---|---|---|
| 1,056,359 | 1/1967 | United Kingdom | 318/318 |

*Primary Examiner*—J D Miller
*Assistant Examiner*—Robert J. Hickey
*Attorney, Agent, or Firm*—Blum, Moscovitz, Friedman & Kaplan

[57] ABSTRACT

A brushless rotary signal transducer having a novel configuration to provide A.C. output voltages in stator windings proportional to the speed of rotation of a rotor and the voltage of a D.C. excitation signal applied to an excitation winding is provided. The excitation winding and stator are disposed within a magnetic permeable housing substantially axially aligned about the axis of the housing. A rotor formed of magnetic permeable material is rotatably mounted on the housing axis, at least the portion thereof in radial registration with the stator being magnetically asymmetrically distributed about said axis. A rotating closed flux path is defined by the rotor, stator and housing.

26 Claims, 6 Drawing Figures

BRUSHLESS ROTARY SIGNAL TRANSDUCER

BACKGROUND OF THE INVENTION

This invention relates to a brushless rotary signal transducer and in particular to a signal transducer having a novel rotor configuration for producing an A. C. output voltage proportional to the speed of rotation of the rotor and the voltage of an excitation signal applied thereto. Heretofore, rotary signal transducers have taken on various forms which have been less than completely satisfactory. Some rotary transducers utilize brushes which caused friction effects including friction drag and increased maintenance. Although brushless rotary signals transducers have been developed to overcome the disadvantages which inure to rotary transducers having brushes, such brushless rotary signal transducers have been formed of complex constructions. Accordingly, a brushless rotary signal transducer having a simplified mechanical construction in which the number of elements thereof is reduced and the operation is inproved is herein provided.

SUMMARY OF THE INVENTION

Generally speaking, in accordance with the invention, a brushless rotary signal transducer for producing an A.C. output voltage which is proportional to the speed of rotation of a rotor and the voltage of the excitation signal applied thereto is provided. The transducer is comprised of a housing formed from a magnetic permeable material, the housing defining an axis, and an excitation winding concentrically disposed about the axis of the housing within said housing, the excitation winding being adapted to have an excitation signal applied thereto. A stator having a winding is disposed about the housing axis within the housing and is substantially axially aligned with said excitation winding. A rotor formed of magnetic permeable material is rotatably mounted on the housing axis, at least the portion thereof in radial registration with the stator being magnetically asymmetrically distributed about said axis. A magnetic field is produced by said excitation windings and a closed flux path is defined by the stator housing, and asymmetrical rotor, the rotation of which effects a rotating field to thereby produce an output signal in said stator winding representative of the rotary position of said rotor and said excitation signal.

Accordingly, it is an object of this invention to provide an improved brushless rotary signal transducer for providing an A.C. signal.

Another object of this invention is to provide an improved rotary signal transducer wherein the alternating signal generated thereby is proportional to the speed of rotation of the rotor and the amplitude of the excitation signal applied thereto.

Still another object of the instant invention is to provide an improved brushless rotary signal transducer having fewer elements yet admitting of improved operational characteristics.

Still another object of the invention is to provide an improved rotary signal transducer wherein fewer parts are utilized to therefore reduce the manufacturing costs thereof.

Still other objects and advantages of the invention will in part be obvious and will in part be apparent from the specification.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
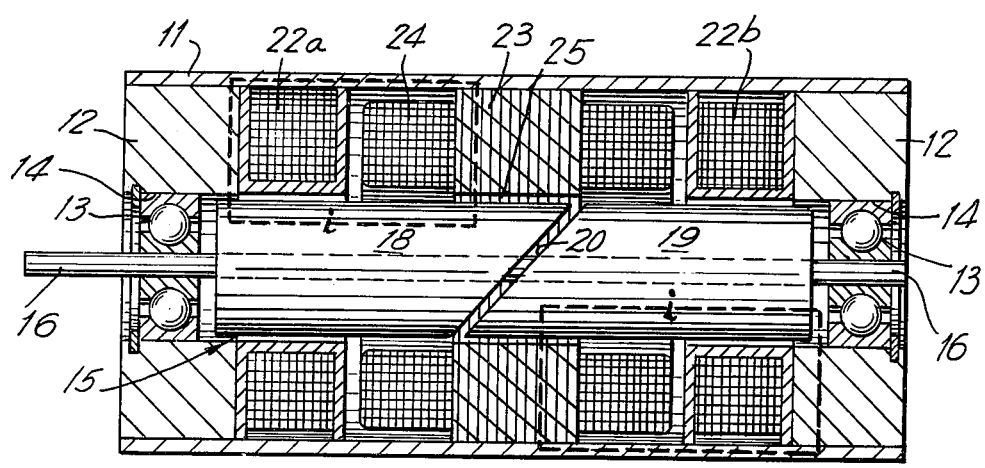
FIG. 1 is an elevated sectional view of a brushless rotary signal transducer constructed in accordance with the preferred embodiment of the instant invention.

Referring now to FIG. 1, a brushless rotary signal transducer, generally indicated at 10, has a housing 11 which mounts the various structural elements. The housing 11 is formed of a magnetic permeable material to allow a flux field to flow therein. Housing 11 has a cylindrical cross-section with two magnetic permeable end walls 12 defining apertures concentrically positioned about the axis of the housing, said apertures supporting bearings 13 therein.

Bearings 13 rotatably support a rotor assembly generally indicated as 15. The rotor assembly comprises a non-magnetic drive shaft 16 which is mounted to freely rotate within bearings 13. A first magnetic permeable core 18 and a second magnetic permeable core 19 are supported by non-magnetic shaft 16 to form a cylindrical rotor adapted to be axially positioned in the housing with the first core 18 separated by a non-magnetic or low permeability layer hereinafter referred as an isolating layer 20 from the second core 19, the physical and magnetic separation thereof being hereinafter discussed.

Two bobbin wound excitation coils 22a and 22b are concentrically positioned adjacent the end walls 12 of the housing. It is noted that the term bobbin wound is utilized in a descriptive sense, and that the excitation coils 22a and 22b can be formed in any well known construction including bobbin wound, bobbin-less wound, free form and the like.

Figure 2:
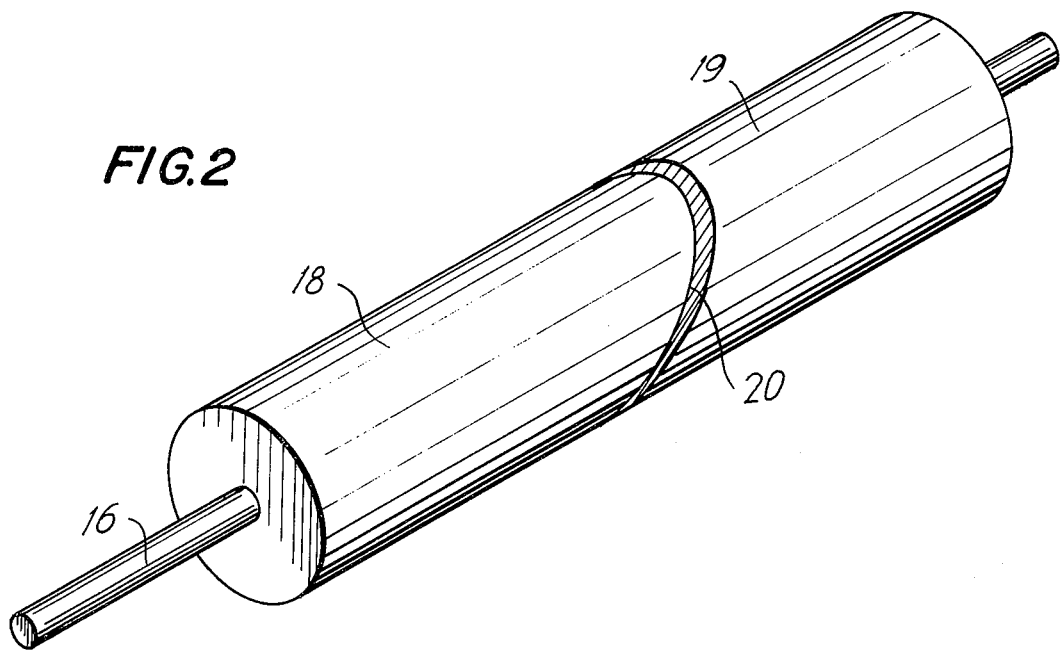
FIG. 2 is a perspective view of the rotor depicted in FIG. 1.

A wound stator assembly 23 is positioned between the cylindrical wall 11 of the housing and the rotor 15, the wound stator assembly being concentrically located adjacent to and between the two bobbin wound coils 22a and 22b. The wound stator assembly 23 includes stator windings 24 wrapped around laminated stator yoke 25 in a conventional manner, the wrapping of the stator windings effecting a sinusoidal or other signal distribution. The isolating layer 20 is positioned between first rotor core 18 and second rotor core 19 so that during rotation of the rotor, one of the rotor cores is magnetically coupled to a part of the stator winding at a time when the other core is magnetically isolated from the same stator winding part but couples a different part of the stator winding. The polarity of the magnetic fields in the rotor cores in the vicinity of the stator winding causes the magnetic flux to be additive in the manner in which it links the stator winding, i.e., core 18 may be NORTH when core 19 is SOUTH. The isolating layer may consist of an air gap or any low permeable magnetic material and is defined by a plane defining an angle with the housing axis (shaft 16). In this manner, the magnetic portion of each rotor core in axial registration with the stator yoke 25 is asymmetrically distributed about said axis. In the embodiment depicted in FIGS. 1 and 2, the angle defined between the housing axis and shielding layer 20 is such that during certain rotary positions of the rotor, rotor cores 18 and 19 are out of facing relationship with each of the stator windings 24, thereby defining an open flux path therebetween. Finally, the other end of the cylindrical rotor cores 18 and 19 extend into the aperture 14 defined by the end walls 12 of the housing 11 to define a closed magnetic flux path between the respective rotor cores, the respective end walls 12, the gap therebetween and the stator yoke 25.

In operation, a D.C. excitation signal is applied to bobbin-wound excitation coils 22a and 22b to thereby effect a magnetic field. The closed flux loop paths of the magnetic field generated are illustrated by the loops i and flows as follows: axially through the first and second rotor cores 18 and 19 respectively; radially through the air gaps between the rotor cores 18 and 19 respectively and the stator yoke 25, to the housing 11; axially through the housing to the respective ends walls 12; and through the air gap between the end walls 12 and the outer end of the rotor cores 18 and 19 respectively, to complete the flux loops. Accordingly, the shape of the rotor core provides a magnetic coupling of each rotor core to each of the stator windings during essentially ½ the revolution of the rotor and a magnetic decoupling during the remaining half of the rotor's revolution. As is appreciated, because each rotor core is not simultaneously in magnetic coupling with both the stator pole with which it is aligned and the stator poles essentially 180° electrically opposed therefrom, due to the positioning of the isolating layer therebetween on an incline with respect to the axis of the rotor, an alternating emf is induced in the stator windings during the rotation of the rotor, the alternating emf generating an A.C. signal in the stator windings having a frequency corresponding to one cycle per revolution. Of course, by varying the number of poles of the winding and the configuration of the rotor, other output frequencies per revolution can be obtained. Accordingly, the A.C. voltages induced in the stator windings 24 are directly and linearly related to both the amplitude of the D.C. excitation voltage and the speed of rotation of the rotor.

It is noted, that by an appropriate selection of magnetically soft materials for use in the housing, rotor cores, etc., a rotary signal transducer constructed in accordance with the instant invention will permit the extension of the linear relationship between the amplitude of the D.C. input voltage and the induced A.C. output voltage during rotation of the shaft. As compared with other embodiments herein, for a given total of ampere turns in the two bobbin wound coils, a higher induced voltage is obtained because both NORTH and SOUTH poles of the stator winding are coupling flux from the rotor simultaneously, thereby providing a very efficient utilization of the winding. Additionally, the linear range is extended by the use of the two bobbin wound coils 22a 22b.

Accordingly, the output voltage induced in the stator windings is directly and linearly related to both the amplitude of the D.C. excitation voltage and the speed of rotation of the rotor, the rotor being mechanically coupled to a device, the speed of which is to be measured. The direction of magnetic flux flow and hence the polarity and/or phase sequence of the output voltage generated therein can be reversed by reversing the polarity of the D.C. excitation signal or by reversing the winding sequences of the bobbin wound coils. While isolating layer 20 is depicted as inclined to the axis of drive shaft 16, other alignments may be utilized so long as each rotor core 18, 19 is substantially isolated in the radial direction relative to said drive shaft, from a sector of the stator yoke 23.

Figure 3:
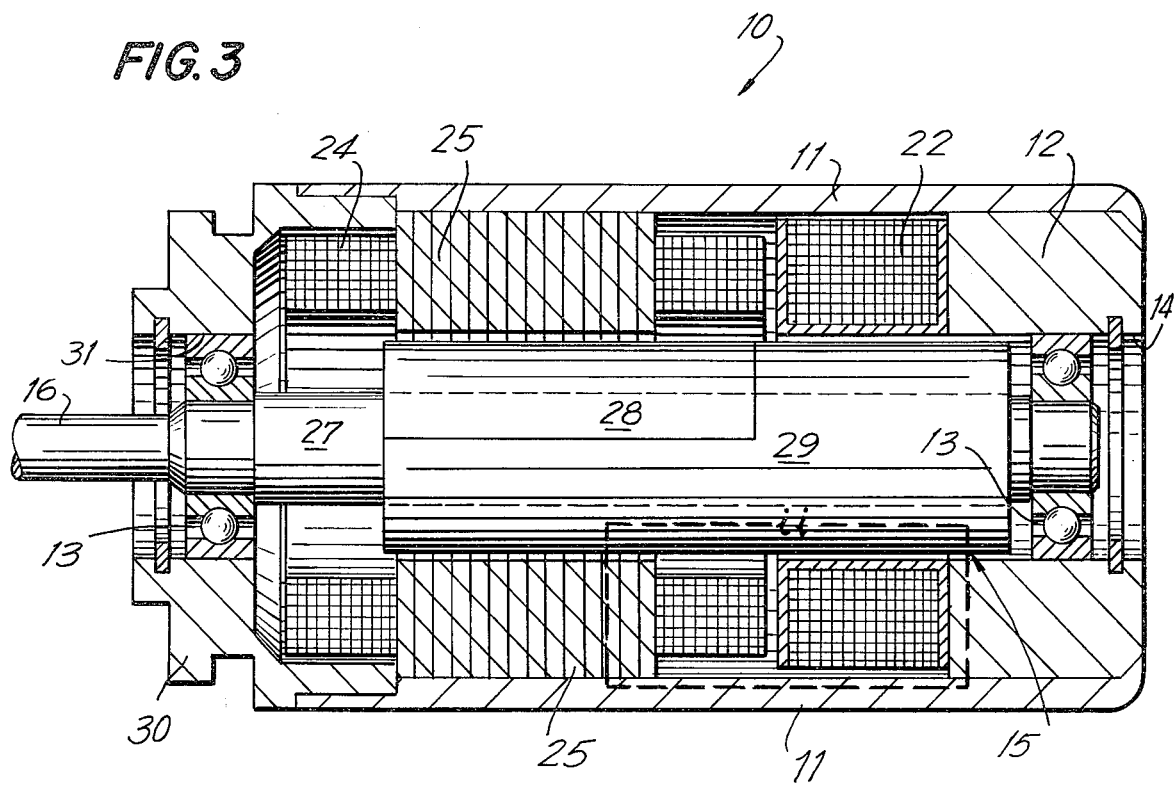
FIG. 3 is an elevated sectional view of a brushless rotary signal transducer constructed in accordance with an alternate embodiment of the instant invention.
Figure 4:
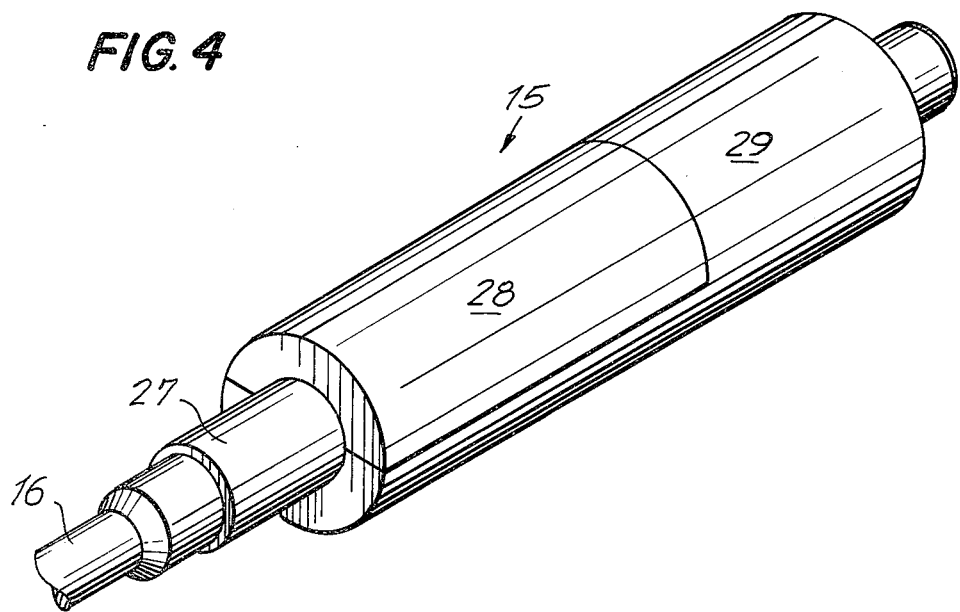
FIG. 4 is a perspective view of the rotor illustrated in FIG. 3.

Reference is now made to FIG. 3 wherein another embodiment of the brushless rotary signal transducer depicted in FIG. 1 is illustrated, like reference numerals being utilized to denote like elements. The transducer, generally indicated at 10, includes a bobbin wound excitation coil 22 concentrically disposed adjacent to the end wall 12. The other end of the cylindrical housing includes closure 30 which may be magnetic or non-magnetic and defines an aperture 31 which is adapted to support a bearing 13. Bearing 13 rotatably supports a rotor core assembly 15 mounted on a drive shaft 16 which may be magnetic or non-magnetic.

The rotor core assembly includes a first magnetic permeable core portion 29 and a second non-permeable core portion 28 secured to drive shaft 16 by a magnetic permeable support 27.

In operation, a D.C. excitation signal is applied to bobbin wound excitation coil 22 to effect a magnetic field. The closed flux path of the magnetic field generated, as indicated by loop ii, is as follows: axially through the magnetic rotor pole piece 29; radially through the air gap between the rotor pole 29 and the stator yoke 25; radially through the stator yoke 25 to the housing 11; axially through the housing 11; and returned through end wall 12 in the radial direction to complete the flux loop.

The stator windings 24 which may be sinusoidally distributed sense a rotating magnetic field during rotation of the rotor cores. Because of the configuration of the rotor, magnetic coupling of each stator winding 24 is provided during the revolution of the rotor when the magnetic permeable core portion 29 is in proximity to a stator winding pole in stator yoke 25 and is magnetically decoupled when the non-magnetic rotor core portion 28 is proximate the stator winding pole. As noted in the above explanation of FIG. 1 the steady state D.C. excitation signal therefore effects a magnetic field which follows the rotation of the rotor and induces an alternating emf in the stator windings at a frequency corresponding to one cycle per revolution. The non-magnetic core portion 28 provides a dynamically balanced rotor despite the asymmetrically distributed magnetic rotor core portion 29.

Figure 5:
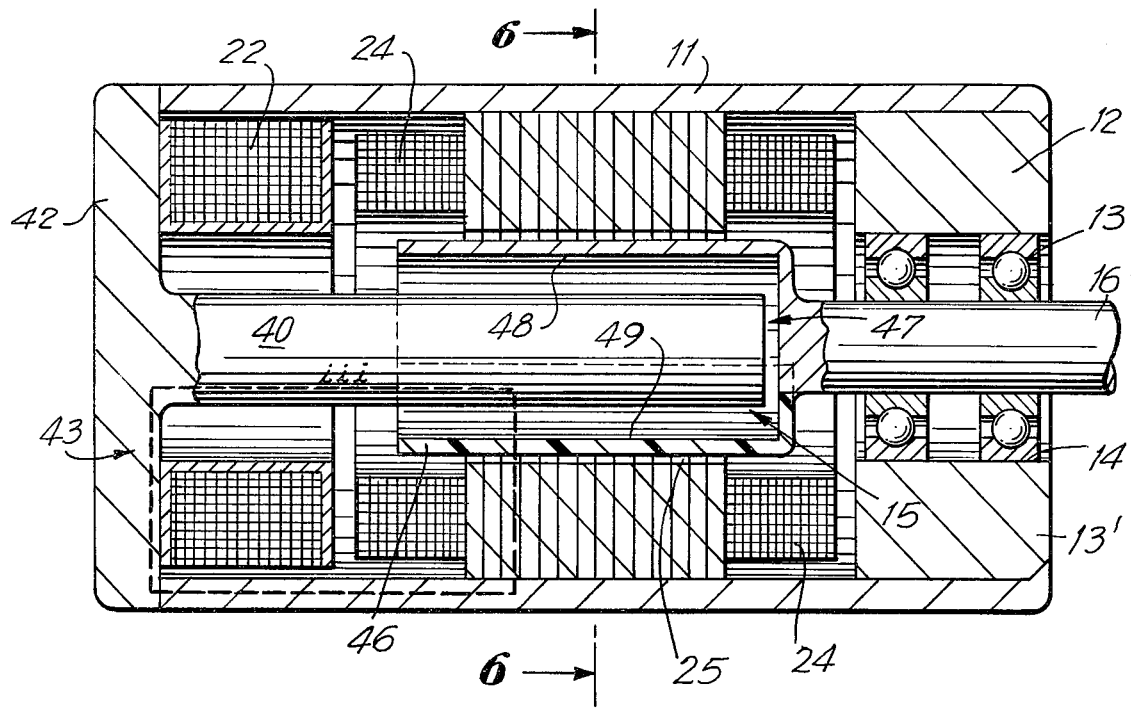
FIG. 5 is an elevated sectional view of a brushless rotary signal transducer constructed in accordance with still another alternate embodiment of the instant invention.
Figure 6:
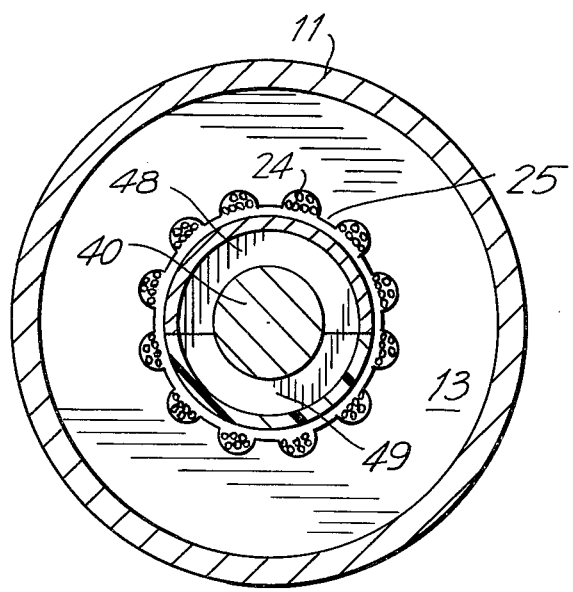
FIG. 6 is a sectional view taken along the line 6—6 of FIG. 5.

Referring now to FIGS. 5 and 6, still another embodiment of a rotary signal transducer constructed in accordance with the instant invention is depicted, like reference numerals being utilized to denote like elements.

The magnetic permeable housing 11 is closed by an end wall 12 which defines an aperture 14 adapted to support bearing 13 which in turn rotatably supports the drive shaft 16 of the rotor core assembly 15. An end cap assembly, generally indicated as 43, includes a magnetic permeable end wall 42 forming a closure at the opposite end of the cylindrical housing 11 and a magnetic permeable hub 40 integrally formed with the end wall 42.

The rotor core assembly 15, in addition to drive shaft 16, includes an inwardly directed cup-shaped rotor portion including a cylindrical side wall 46 and may include a bottom wall 47, said cup-shaped rotor portions defined by side wall 46 extending between the inwardly projecting hub 40 and the stator yoke 25. A portion of the cylindrial side wall 46 is formed of a magnetic permeable material. The bottom wall 47 may be of either magnetic or non-magnetic material. The magnetic portion of the cup-shaped rotor is preferably not defined by a plane passing through the axis of rotor core assembly 15 in order to minimize harmonics. The remainder of the cylindrical side wall 48 is made of non-magnetic material.

In operation, a D.C. excitation signal is applied to bobbin wound excitation winding 22 to effect a magnetic field. A closed flux loop iii is generated as follows: axially through the hub 40; radially through cylindrical side wall 46 and stator yoke 25; axially through the housing wall 11; and returned radially through the end wall 42 to hub 40. Of course no flux loop is generated in the stator windings proximate to the non-magnetic portion of the cup-shaped rotor. Accordingly, the stator windings 24 generate a sinusoidally distributed A.C. signal representative of the magnitude of the excitation signal applied to the bobbin wound coil 22 and the rotational speed of the rotor core assembly.

Accordingly, in each of the above noted embodiments, the rotor is formed of a geometrical configuration to provide alternate coupling and decoupling to each of the stator windings during a revolution of the rotor. The steady state D.C. excited magnetic field therefore follows the rotation of the rotor and induces an alternating emf in the stator windings at a frequency corresponding to one cycle per revolution. If the number of poles of the winding is varied or the configuration of the rotor is varied, other output frequencies per revolution can be obtained. Also modification of the arcuous dimensions and/or angle of separation between the rotor elements and between the rotor and the windings will determine the phase and amplitude of the alternating signal generated in the stator windings.

It is further noted that a rotary signal transducer constructed in accordance with the instant invention is not limited to the application of D.C. excitation signals thereto, but is particularly adapted to provide a variety of modulated voltage outputs in response to the application of A.C. signals to the bobbin wound excitation windings. Accordingly, one such use of such a transducer as a brushless tachometer is obtained by applying an A.C. signal to the bobbin wound excitation windings. Of course, when the transducer operates as a brushless tachometer, the output voltage is modulated by rotating the rotor at a constant speed or at a continuously or discontinuously variable speed. Similarly, by exciting the bobbin wound excitation coil with a D.C. signal, the transducer operates as a brushless tachometer whereby the amplitude and frequency of the output voltage obtained functions linearly with respect to the speed of rotation, and the amplitude can be varied, adjusted or modulated to provide control and modulation thereof.

Furthermore, the use of the rotary signal transducer of the instant invention as a syncro or resolver is achieved by the application of A.C. signals to the excitation coils and positioning the shaft at a reference position to thereby provide a brushless syncro or resolver.

Also, by varying the number of magnetic and non-magnetic core portions of the rotor along with appropriate changes in the stator configuration, the frequency of the output signal can be likewise varied for each revolution of the rotor.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A brushless rotary signal transducer comprising a housing formed of a magnetic permeable material and defining an axis, said housing defining at least one magnetically permeable wall closing a first end of same, rotor means disposed in said housing substantially on said axis and having a rotor core at least in part formed of magnetic permeable material and a drive shaft for supporting said rotor core, said shaft projecting from said housing substantially along the axis thereof and being adapted to be rotatably driven; stator means within said housing in substantial axial alignment with said excitation winding and including a yoke concentrically disposed in said housing between said housing and said rotor; an excitation winding axially disposed between said housing end wall and said stator means, said excitation winding being adapted to generate a flux field upon the application of an excitation signal thereto, and at least one stator winding wound on said stator yoke, at least a portion of said rotor core in radial registration with said stator yoke being magnetically asymmetrically distributed about said axis to define a rotating closed path for said flux field with at least said stator means, housing and magnetically permeable portion of said rotor core for the generation of signals in said stator winding representative of the rotary position of said rotor core and said excitation signal.

2. A brushless rotary signal transducer as claimed in claim 1, wherein said rotor core includes a portion of low magnetic permeability substantially radially reducing the magnetic flux in said asymmetrical rotor core portion from a portion of said stator winding.

3. A brushless rotary signal transducer as claimed in claim 1, wherein said magnetically asymmetrical rotor core portion and stator winding are adapted to produce an A.C. signal in said stator winding proportional to the field of rotation of said rotor means and said excitation signal.

4. A brushless rotary signal transducer as claimed in claim 2, wherein said rotor drive shaft is non-magnetic and the magnetic permeable portion supported thereby includes two substantially cylindrically shaped rotor cores, said low magnetic permeability portion substantially magnetically isolating each rotor core from each other and minimizing the magnetic flux linkage between each rotor core and a continuously differing part of the stator during an entire revolution of said rotor cores.

5. A brushless rotary signal transducer as claimed in claim 4, wherein said low peermeability isolating portion defines a layer sandwiched between two surfaces of said rotor cores, said surfaces being defined by a plane at an angle with respect to said housing axis.

6. A brushless rotary signal transducer as claimed in claim 5, wherein said low magnetic permeability isolating layer is one of a group of non-magnetic materials including aluminum, brass, plastic and air.

7. A brushless rotary signal transducer as claimed in claim 5, wherein a plurality of stator windings are wound on said stator yoke, so that said rotating closed path for said flux field couples at least one of said stator windings at each rotational position of the rotor.

8. A brushless rotary signal transducer as claimed in claim 7, wherein said magnetic permeable housing is cylindrically formed about said axis and includes two end walls defining apertures therein for rotatably supporting said rotor means.

9. A brushless rotary signal transducer as claimed in claim 8, wherein both of said end walls are magnetically coupled to said rotor.

10. A brushless rotary signal transducer as claimed in claim 2, wherein a plurality of stator windings are wound on said stator yoke, so that said rotating closed path for said flux field couples with at least one of said stator windings at each rotational position of the rotor.

11. A brushless rotary signal transducer as claimed in claim 10, wherein said rotor is cylindrically formed about the axis of said drive shaft, said low magnetic permeability portion and said magnetic permeable portion being defined by a plane parallel to said rotor axis.

12. A brushless rotary signal transducer as claimed in claim 11, wherein the mass of said magnetically permeable portion and said low magnetic permeability portions of said rotor are symmetrically mechanically distributed about said rotor axis for dynamic balancing thereof.

13. A brushless rotary signal transducer as claimed in claim 12, wherein said magnetic permeable housing is cylindrically shaped and includes two magnetic permeable end walls adapted to rotatably support said rotor, each said end wall being magnetically coupled to said rotor.

14. A rotary transducer as claimed in claim 10, wherein said end cap including a hub extending into said housing substantially along the axis of said housing, said rotor being cup-shaped and disposed between said stator windings and said hub portion, said hub portion of said housing and said end cap further defining said rotating closed flux path.

15. A rotary transducer as claimed in claim 14, wherein said low magnetic permeability material portion of said cup shaped rotor is defined by a plane not intersecting said rotor axis but parallel therewith.

16. A brushless rotary signal transducer comprising a cylindrical housing, an excitation winding concentrically disposed about the axis of said housing, said excitation winding being adapted to generate a flux field upon application of an excitation signal thereto, rotor means rotatably disposed in said housing on said axis including a drive shaft, two substantially cylindrical magnetic permeable rotor cores and a portion of low magnetic permeability secured to said drive shaft, the mass of said rotor cores being mechanically symmetrically distributed about the axis thereof for dynamic balance, said drive shaft projecting from said housing substantially along said axis thereof and being adapted to be rotatably driven; stator means within said housing in substantial axial alignment with said excitation winding and including a stator yoke concentrically disposed in said housing between said housing and both said rotor cores, and at least one stator winding wound on said stator yoke, said rotor cores being rotated into radial registration with a portion of the stator yoke having a stator winding wound therearound to define a rotating closed path for said flux field in at least said portion of said stator yoke, housing and rotor core, said low magnetic permeable portion substantially magnetically isolating each rotor core from each other and minimizing the magnetic flux linkage between each respective rotor core and a continuously differing part of the stator yoke portion during an entire revolution of both said rotor-cores to thereby generate asymmetrically distributed signals in said stator winding representative of the rotary position of each said rotor core and said excitation signal.

17. A rotary transducer as claimed in claim 16, wherein said magnetically asymmetrical rotor cores are adapted to produce an alternating signal in each of said stator windings proportional to the field of rotation of said rotor and said excitation signal.

18. A brushless rotary signal transducer as claimed in claim 16, wherein said low permeability isolating portion defines a layer sandwiched between two facing surfaces of said rotor cores.

19. A brushless rotary signal transducer as claimed in claim 18, wherein said two facing surfaces of said rotor cores are defined by a plane at an angle with respect to said housing axis.

20. A brushless rotary signal transducer as claimed in claim 19, wherein said low magnetic permeability isolating layer is one of a group of nonmagnetic materials including aluminum, brass, plastic and air.

21. A brushless rotary signal transducer as claimed in claim 19, wherein a plurality of stator windings are wound on said stator yoke, so that said rotating closed path for said flux field couples at least one of said stator windings at each rotational position of said rotor.

22. A brushless rotary signal transducer as claimed in claim 21, wherein said magnetic permeable housing is cylindrically formed about said axis and includes magnetically permeable end walls for closing same, said end walls defining apertures therein for rotatably supporting said rotor means.

23. A brushless rotary signal transducer as claimed in claim 22, wherein said excitation coils are axially disposed between said end walls and said stator means, said end walls being magnetically coupled to said rotor.

24. In a brushless rotary signal transducer comprising a cylindrical housing, an excitation winding concentrically disposed about the axis of said housing, said excitation winding being adapted to generate a flux field upon the application of an excitation signal thereto; rotor means disposed in said housing to rotate around the axis thereof, and having a cylindrically shaped rotor core, the mass thereof being mechanically symmetrically distributed about the axis thereof, a first part thereof being formed of magnetic permeable material, the remaining part of said cylindrical rotor core being formed of a low magnetic permeability material, said first and second parts being defined by a plane parallel to said rotor means axis but not intersecting said axis, and a drive shaft for supporting said rotor core, said drive shaft projecting from said housing substantially along the axis thereof and being adapted to be rotatably driven; stator means within said housing in substantial axial alignment with said excitation winding and including a yoke concentrically disposed in said housing between said housing and said rotor, and at least one stator winding wound on said stator yoke, at least a portion of said cylindrical rotor core in radial registration with said stator yoke being magnetically asymmetrically distributed about said axis to define a rotating closed path for said flux field with at least said stator, housing and magnetically permeable part of said cylindrical rotor core for the generation of signals in each said stator winding representative of the rotary position of said magnetic permeable part of said rotor core and said excitation signal.

25. A brushless rotary signal transducer comprising a cylindrical housing, said housing having a magnetic permeable end wall, said end wall supporting an inwardly projecting magnetically permeable hub along the axis of said housing; an excitation winding concentrically disposed about the axis of said housing, said excitation winding being adapted to generate a flux field on application of an excitation signal thereto; a cup-shaped rotor rotatably disposed in said housing substantially on said axis and having a first part thereof formed of a magnetic permeable material and the remaining portion of said cup-shaped rotor formed of a low magnetic permeable material and a drive shaft rotatably supporting said rotor, said shaft projecting from said housing substantially along the axis thereof to be rotatably driven; stator means within said housing in substantial axial alignment with said excitation winding and including a yoke concentrically disposed in said housing between said housing and said rotor, and at least one stator winding wound on said stator yoke, said cup-shaped rotor core being disposed between said hub and said stator yoke, said magnetically permeable part of said rotor in radial registration with said stator yoke defining a rotating closed path for said flux path with at least said stator, housing hub and magnetically permeable part of said rotor core, for generating signals in said stator winding representative of the rotary position of said cup-shaped rotor and said excitation signal.

26. A brushless rotary signal transducer as claimed in claim 25, wherein said magnetic permeable portion of said cup-shaped rotor is defined by a plane parallel to the axis of said shaft but not intersecting said axis.

* * * * *